United States Patent [19]

Fenton

[11] Patent Number: 5,128,042
[45] Date of Patent: Jul. 7, 1992

[54] DESALINATION OF BRACKISH WATER OR BRINE FROM HYDROCARBON WELLS

[75] Inventor: Donald M. Fenton, Anaheim, Calif.

[73] Assignee: Union Oil Company of California, Los Angeles, Calif.

[21] Appl. No.: 722,010

[22] Filed: Jun. 27, 1991

Related U.S. Application Data

[63] Continuation-in-part of Ser. No. 659,027, Feb. 21, 1991, Pat. No. 5,076,934.

[51] Int. Cl.$^5$ .............................................. B01D 61/02
[52] U.S. Cl. ..................................... 210/642; 210/649
[58] Field of Search ................. 202/176; 55/16, 158; 210/634, 321.72, 640, 321.6, 642, 644, 649–654; 166/57, 267; 203/DIG. 24, DIG. 17

[56] References Cited

U.S. PATENT DOCUMENTS 4,882,009 11/1989 Santoleri et al. .................. 202/176

OTHER PUBLICATIONS

"Reverse Osmosis" by Richard G. Sudak, *The Handbook of Industrial Membrane Technology*, Mark Porter, Editor, Noyes Publications 1990, Chapter 4.

"A Thirsty California is Trying Desalination" by Lawrence M. Fisher, New York Times, Nov. 18, 1990.

"California Water Shortage Poses Challenges for State Policymakers," *California Water*, A Special Report by the California Chamber of Commerce, Jun. 15, 1990.

U.S. patent application Ser. No. 659,027 filed Feb. 21, 1991 by Donald M. Fenton for Desalination of Brackish Water from Oils Wells.

*Primary Examiner*—Frank Sever
*Attorney, Agent, or Firm*—Charles L. Hartman; Gregory F. Wirzbicki

[57] ABSTRACT

Non-brackish water can be produced from the brackish water or brine containing at least 500 ppm total dissolved solids coproduced in many active hydrocarbon product wells and found in many inactive gas wells. The brackish water or brine is desalinated producing non-brackish water, preferably, potable water. A preferred method of desalination is by reverse osmosis.

44 Claims, No Drawings

DESALINATION OF BRACKISH WATER OR BRINE FROM HYDROCARBON WELLS

RELATED APPLICATIONS

This application is a continuation-in-part of U.S. patent application Ser. No. 659,027, filed Feb. 21, 1991, now allowed U.S. Pat. No. 5,076,934 and hereby incorporated in full by reference.

BACKGROUND OF THE INVENTION

1. Field of the Invention

This invention relates to methods of using hydrocarbon product wells producing both a hydrocarbon product and brackish water or brine, and the use of these wells as a water source, as well as to apparatus for desalinating water that include hydrocarbon product wells producing brackish water or brine.

2. State of the Art

Hydrocarbon product wells produce oil, gas and sometimes other alternative products, for example, brackish water or brine. Usually the alternative products are thought of as being of no value at all. The well can be active and coproduce the hydrocarbon products and the alternative products, or it can be inactive, many times because the well over produced the alternative coproduct.

When a hydrocarbon product well ceases to produce oil or gas, either because the well runs dry or because it starts to produce large amounts of some less desired alternative product, for example, brackish water or brine, the well is inactivated. First, the hole is plugged temporarily by closing its valves, but the well must be physically blocked with concrete or the like to permanently plug it. Then, if a well site is to be abandoned, whatever superstructure that might exist must be removed from the site. In the case of inactivating all the hydrocarbon product wells on off-shore oil platforms, the process is particularly expensive. As on land, each of the wells must be plugged. However, the entire superstructure of the platform must be removed from its moorings on the sea floor and the platform removed from the site as a potential hazard to navigation. Inactivating is an expected occurrence in the life of a hydrocarbon product well, but it is expensive and removes a potential resource, particularly if the well is producing an alternative product.

Brackish water, one alternative product associated with many hydrocarbon product wells, is normally thought to be of little value, because, although it is not as salty as sea water, it is too salty to be used for either human consumption or agriculture. However, many hydrocarbon product wells are located in arid or semi-arid locales where potable water can be an extremely valuable resource. In California, one such semi-arid locale, the increasing population has an ever increasing need for water. However, parts of California have suffered from severe drought, and may continue to suffer from drought, straining the available water resources so much that many local governments in California plan to build desalination facilities to desalinate sea water, despite the expense.

Not all sources of brackish water or brine are considered suitable for creation of potable water, that is, water for human consumption. In some instances the source of water is considered unsuitable even for agricultural use. Municipal waste water is an example of a source of water not considered suitable for human consumption. In some areas of the country it is treated for reuse, but not for human consumption.

For most purposes, the most widely used methods of desalinating salt water are distillation and reverse osmosis. An overview of reverse osmosis technology is found in *The Handbook of Industrial Membrane Technology*, Mark Porter editor, Noyes Publications 1990, chapter 4, hereby incorporated by reference in its entirety. This publication discloses the implementation of reverse osmosis technology in many environments, using different feed waters, different membranes, and processing to different purities. One feed water not discussed was brackish water or brine from inactivated hydrocarbon product wells.

It would be useful if one could use the non-oil producing wells to produce potable water from the brackish water or brine that is now discarded.

SUMMARY OF THE INVENTION

Non-brackish water is produced from the brackish water or brine found in many inactivated hydrocarbon product wells, and is coproduced in many active wells. An inactive hydrocarbon product well is perforated at a level that produces brackish water or brine, or in the case of an active hydrocarbon producing well, the brackish water or brine is coproduced with the hydrocarbon product. The brackish water or brine is pumped out, separated from any residual hydrocarbons and desalinated. Preferably, potable water is produced. A preferred method of desalination is by reverse osmosis.

If brackish water or brine is contained in a particular level different from the hydrocarbon product producing level, then, after ceasing hydrocarbon production, the well is perforated at the level known to produce water. Alternatively, water may be a by product of the hydrocarbon product as it is produced. The water is then separated and recovered. The recovered brackish water or brine is then desalinated, that is, at least some dissolved solids are removed. It is preferred to sufficiently desalinate to produce potable water for human consumption or water for agricultural use.

An important discovery of this invention is that brackish water or brine heretofore thought useless from active hydrocarbon product wells or inactive gas wells can be used to produce inexpensive potable water. The importance can be seen in the case of Santa Barbara, Calif., where water is in short supply even in years with normal rain fall. The city has, from 1986 to 1991, experienced a serious continuing drought placing the water supply in critical shortage. Therefore, the city is seriously considering desalinating sea water, even though present the cost is about $9.00 per thousand gallons. The use of this invention, on the other hand, could produce water for about $1.50 to $2.00 per thousand gallons. It would be possible to use this invention in Santa Barbara, since the city is near many hydrocarbon product wells, both on land and off-shore.

DETAILED DESCRIPTION OF THE INVENTION

"Brackish water," as used herein, refers to water containing from 500 ppm to 10,000 ppm total dissolved solids, and especially water containing between 500 ppm and 5000 ppm total dissolved solids. In contrast, sea water is considered to contain nominal total dissolved solids of about 35,000 ppm. "Brine," as used herein, refers to water having more than 10,000 ppm total dissolved solids, and preferably to water having between 10,000 and 20,000 ppm total dissolved solids. "Non-brackish" water refers to water containing from 100 ppm to 500 ppm total dissolved solids. "Potable water", which is that water suitable for human consumption, and has less than 250 ppm total dissolved solids. Usually potable water will have from 100 ppm to 250 ppm total dissolved solids. Water suitable for agricultural use can have more total dissolved solids, for example, from 200 ppm to 500 ppm total dissolved solids.

It is preferred that the brackish water or brine flow to the surface under its own pressure, but it is acceptable if the water can be readily pumped from the hole. Typical flow rates are greater than ten cubic feet per minute, preferably greater than twenty cubic feet per minute. The means of recovery of the brackish water or brine can be by any standard method. The brackish water or brine may not be at the level that the oil had been produced, requiring the penetration of the well casing to obtain the water from the inactive hydrocarbon product well.

As used herein, the term "hydrocarbon product" refers to all hydrocarbons produced from wells. Therefore, oil, gas and mixtures of both are embraced by this term.

The brackish water or brine may flow from any hydrocarbon product well whether active or inactive. If the brackish water or brine is coproduced with hydrocarbon product, then the hydrocarbon product must be separated and the water cleaned before desalination. Similarly, since the brackish water or brine removed from an inactive hydrocarbon product well will certainly have come into contact with hardware that formerly contacted crude oil, the water may need cleaning as an integral part of desalination. It is greatly preferred that this be done prior to desalination to avoid contacting the desalination apparatus with oily residue or corrosive gases and the like. In particular, any oily residue may be separated by flotation, by skimming the surface of the water to remove floating oily debris. Then the water can be further purified by filtration, or by passage over an adsorbent, for example, activated charcoal or diatomaceous earth, to remove any gases or emulsified oil that might be present in the water. Any gases in the water are removed by, for example, sparging. The brackish water or brine is desalinated to produce non-brackish water by methods including reverse osmosis, freezing the water and recovering the fresh water ice and evaporative recovery, for example, distillation. The method chosen depends on the local environment and on cost. Usually, reverse osmosis will be the preferred desalination technique. The non-brackish water produced may have more total dissolved solids than suitable for potable water, but still be suitable for agricultural use. Preferably, however, the water produced will be potable.

In the process of reverse osmosis, a pressurized water solution contacts a membrane on a first side partitioning the solution into a less concentrated solution on the second side of the membrane and a more concentrated solution on the first. The less concentrated solution, the non-brackish water, is then collected. The more concentrated water is disposed of. Since the osmotic pressure of any aqueous solution depends on the concentration of the solution, dilute solutions can be more easily desalinated than more concentrated solutions using reverse osmosis. Reverse osmosis is particularly preferred as a desalination method in this invention because the membrane will tend to filter out whatever oil residue and dissolved gases and the like are in the water. Although it is not known exactly how membranes work in reverse osmosis, the generally accepted theory is that they work as filters, allowing smaller molecules to pass, but preventing larger molecules from passing through the membrane. Therefore, the relatively larger hydrocarbon molecules are easily removed from water.

In the process of this invention the membrane selected can be any membrane known to partition aqueous solutions. Suitable membranes known to the art include cellulose acetates, especially cellulose diacetate and cellulose triacetate and the combination of cellulose diacetate and cellulose triacetate, cellulose nitrate, asymmetric aromatic polyamides, as well as composite membranes such as a polyfurane separation membrane laid on a polysulfone support layer. The precise operational conditions depend heavily on the concentration of the brackish water or brine, but, in general, are within the ranges shown in Table 1.

TABLE 1

|  | Typical Range | Preferred Range |
|---|---|---|
| pressure | 250 to 450 psig | 300 to 375 psig |
| pH of feed | 4 to 6 | 4.5 to 5.5 |
| temperature | 0° C. to 80° C. | 20° C. to 60° C. |

Typical membranes produce non-brackish water at a rate of between about 400 to 1600 liters of non-brackish water per day per square meter of membrane.

In a first embodiment, an inactivated hydrocarbon product well, preferably an inactivated gas well, is used. The oily residue and gases are removed and the brackish water or brine desalinated near the well, although the brackish water or brine may be transported to a remote site for processing. Several wells can be processed at one desalination facility. It is preferred to desalinate the brackish water or brine using reverse osmosis. The non-brackish water product can then be transported to a location of use. In the case of water being produced for agriculture, the water can be transported in previously existing irrigation facilities.

In a second embodiment, an activated hydrocarbon product well is used to coproduce hydrocarbon product and brackish water or brine. The oil and gases and residues are removed from the aqueous phase and the brackish water or brine desalinated near the well, although the brackish water or brine may be transported to a remote site for processing. As in the first embodiment, several wells can be processed at one desalination facility. It is preferred to desalinate the brackish water or brine using reverse osmosis.

An off-shore oil platform may have many wells located thereon. In another embodiment of this invention, hydrocarbon product wells on off-shore oil platforms are used, whether they are active or inactive. Although it is preferred to continue using off-shore oil platforms having no active hydrocarbon product wells, brackish water or brine coproduced at an off shore platform can be processed to make non-brackish water. If brackish water or brine can be removed from at least one non-producing well on the platform, then the platform can be used. Typically, these platforms are located in the ocean, surrounded by sea water. Therefore, the brackish water or brine down hole can be recovered at the platform in preference to the surrounding salt water. Any hydrocarbon product is separated from the coproduced product, or in the case of an inactive well, the oily residue and gases are removed on the platform, and the brackish water or brine desalinated at the platform. It is preferred to use reverse osmosis to desalinate brackish water or brine on oil platforms. Then the more concentrated waste water can be readily and environmentally safely discarded in the ocean, and the non-brackish water transported to shore for use.

The water produced on an off shore platform can be transported by piping the water to the location of use. In the case of using an inactive hydrocarbon product well to produce brackish water or brine, it is preferred to pipe the water through pipes formerly used for transporting oil, since these pipes already connect the platform with the shore and at least some of them will no longer be used for transporting oil. These pipes are previously prepared for the task. Such preparation includes cleaning the pipes by use of suitable chemical agents, for example detergents or other surfactants or oil dispersants and physically scrubbing the interior of the pipes by sensing a pig through the pipes. The pipes may also have their interiors coated with a substantially oil-impermeable material. In the case of coproduction, however, dedicated pipes can be laid exclusively for transport of water produced on the platform.

An apparatus for producing non-brackish water from brackish water or brine from an inactive gas well includes an inactivated hydrocarbon product well penetrating a plurality of geological formations of known characteristics, at least some of said formations are known to contain flowable brackish water or brine. The well will have a perforated well casing at a level of a geological formation known to contain flowable brackish water or brine. In this apparatus a desalination plant at the site of the inactive hydrocarbon product well receives flowable brackish water or brine from the inactive hydrocarbon product well. The brackish water or brine recovered from the non-producing well is desalinated at the desalination plant, preferably producing non-brackish water. In one preferred embodiment a plurality of wells provides brackish water or brine to a central desalination plant located at the site of one inactive hydrocarbon product well. It is preferred that the inactive hydrocarbon product well be located on an off shore oil platform. When the hydrocarbon product well is located on an off shore platform, the desalination plant is preferably located at the site of the inactive hydrocarbon product well on the off-shore oil platform. A plurality of platforms can provide brackish water or brine to a central desalination plant located on one platform. The apparatus includes means for separating any oil residue from the recovered brackish water or brine and means for removing any gases from the recovered brackish water or brine. The apparatus can include an evaporative plant, a reverse osmosis plant, or a means for freezing the water and recovering the fresh water ice to desalinate the water. The apparatus includes piping the water through pipes formerly used for transporting oil, after preparing the piping for transporting non-brackish water.

An apparatus for producing non-brackish water from brackish water or brine from an active hydrocarbon well includes an activated hydrocarbon product well that produces brackish water or brine as well as a hydrocarbon product. The apparatus includes a separation means for separating the oil or gas from the brackish water or brine. In this apparatus a desalination plant at the site of the inactive hydrocarbon product well receives flowable brackish water or brine from the inactive hydrocarbon product well. The brackish water or brine separated from the recovered hydrocarbon is desalinated at the desalination plant, preferably producing non-brackish water. In one preferred embodiment a plurality of wells provides brackish water or brine to a central desalination plant located at the site of one active or inactive hydrocarbon product well. It is preferred that the hydrocarbon product well be located on an offshore oil platform. When the hydrocarbon product well is located on an off shore platform, the desalination plant is preferably located at the site of the hydrocarbon product well on the off-shore oil platform. A plurality of platforms can provide brackish water or brine to a central @desalination plant located on one platform. The apparatus can include an evaporative plant, a reverse osmosis plant, or a means for freezing the water and recovering the fresh water ice to desalinate the water. The apparatus includes piping the water through pipes formerly used for transporting oil, after preparing the piping for transporting non-brackish water.

As an example of using brackish water or brine from an inactive hydrocarbon product well, it is known that an inactive well located at the Hueneme field in California produces brackish water or brine at a stratum of sand 250 to 300 feet thick and between 500 to 750 feet deep. At this stratum the well casing is perforated using standard well perforation technology. This stratum produces brackish water or brine containing about 500 to 600 ppm dissolved solids (based on conductivity measurements that assume that all solids are NaCl). After the brackish water or brine is removed from the well, the oily residue and any emulsion is skimmed from the water. Then the brackish water or brine is passed over activated charcoal, removing any odors or colored material from the water. The pH of the water is then adjusted to between 4.5 and 5.5 by adding hydrochloric acid or sodium or potassium hydroxide. The water is then pressurized to 300 psig and contacted with a cellulose triacetate membrane. After the first pass 50% of the feed water is recovered as a non-brackish water product containing a total dissolved solids of no more than 200 ppm. The concentrated brackish water or brine is contacted with a second membrane, and after the second pass 50% of the concentrated brackish water or brine is recovered as a non-brackish water product containing a total dissolved solids of no more than 200 ppm, for a total conversion of 75% of the brackish water or brine converted into non-brackish water. The membrane produces about 850 liters of water a day per square meter of membrane. The desalinated, non-brackish water is then passed over crushed lime to restore taste.

Although this invention has been primarily described in conjunction with examples and by references to embodiments thereof, it is evident that many alternatives, modifications, and variations will be apparent to those skilled in the art in light of the foregoing description. Accordingly, it is intended to embrace within the invention all such alternatives, modifications, and variations that fall within the spirit and scope of the appended claims.

What is claimed is:

1. An apparatus for producing non-brackish water from water containing at least 500 ppm total dissolved solids found in an active hydrocarbon product well comprising:

at least one active hydrocarbon product well located on an off shore oil platform, said well producing a hydrocarbon product and flowable water containing at least 500 ppm total dissolved solids;

a means for separating the hydrocarbon product from the water, said means for separating receiving said flowable water from the active hydrocarbon product well;

a desalination plant located on the off shore platform for receiving water containing at least 500 ppm total dissolved solids from the means for separating and for producing non-brackish water; and means for transporting non-brackish water produced by the desalination plant.

2. The apparatus of claim 1 wherein a plurality of wells provide water to a central desalination plant located on the off shore platform.

3. The apparatus of claim 1 wherein the means for separating comprises a means for skimming the oil from the surface of the water containing at least 500 ppm total dissolved solids.

4. The apparatus of claim 1 wherein said means for separating comprises a means for removing gases from the recovered water containing at least 500 ppm total dissolved solids.

5. The apparatus of claim 1 wherein the desalination plant comprises a means for evaporative recovery.

6. The apparatus of claim 1 wherein the desalination plant comprises a reverse osmosis plant.

7. The apparatus of claim 1 wherein the desalination plant comprises a means for freezing the water and recovering the fresh water ice.

8. The apparatus of claim 1 wherein the means for transporting further comprises pipes formerly used for transporting oil.

9. A method of using an inactivated gas well comprising:

ceasing all gas production in an inactive gas well;

recovering water containing at least 500 ppm total dissolved solids from the inactive gas well from a geological formation containing flowable water containing at least 500 ppm total dissolved solids; and desalinating the water to produce liquid water having less than 500 ppmw total dissolved solids.

10. The method of claim 9 wherein the gas well is located on an off shore oil platform surrounded by salt water.

11. The method of claim 9 wherein the geological formation is the same as that which formerly produced gas.

12. The method of claim 11 including the step of separating oil residue from the water after the recovering step, but before the desalinating step.

13. The method of claim 11 including the step of separating gases from the water after the recovering step, but before the desalinating step.

14. The method of claim 9 wherein the geological formation is different than that which formerly produced oil.

15. The method of claim 14 including perforating the hydrocarbon product well casing at the level of the geological formation that produces water containing at least 500 ppm total dissolved solids.

16. The method of claim 14 including the step of separating oil residue from the water after the recovering step, but before the desalinating step.

17. The method of claim 14 including the step of separating gases from the water containing at least 500 ppm total dissolved solids after the recovering step, but before the desalinating step.

18. The method of claim 9 wherein the desalinating step comprises evaporative recovery.

19. The method of claim 9 wherein the desalinating step comprises reverse osmosis.

20. The method of claim 9 wherein the desalinating step comprises freezing the water and recovering the fresh water ice.

21. The method of claim 9 wherein the non-brackish water produced comprises water suitable for agricultural use.

22. The method of claim 9 wherein the non-brackish water produced comprises potable water.

23. The method of claim 9 including the step of piping the non-brackish water produced to a location of use after the desalinating step.

24. A method of using an active hydrocarbon product well comprising:

recovering a product that includes a hydrocarbon product and water containing at least 500 ppm total dissolved solids;

separating the hydrocarbon product from the water containing at least 500 ppm total dissolved solids; and desalinating the separated water to produce liquid water having less than 500 ppmw total dissolved solids.

25. The method of claim 24 wherein the hydrocarbon product well is located on an off shore oil platform surrounded by salt water.

26. The method of claim 24 wherein the desalinating step comprises evaporative recovery.

27. The method of claim 24 wherein the desalinating step comprises reverse osmosis.

28. The method of claim 24 wherein the separating step comprises flotation.

29. The method of claim 28 wherein the separating step further comprises filtration.

30. The method of claim 28 wherein the separating step further comprises sparging.

31. The method of claim 24 wherein the desalinating step comprises freezing the water and recovering the fresh water ice.

32. The method of claim 24 wherein the non-brackish water produced comprises water suitable for agricultural use.

33. The method of claim 24 wherein the non-brackish water produced comprises potable water.

34. The method of claim 24 including the step of piping the non-brackish water produced to a location of use after the desalinating step.

35. A method of producing non-brackish water comprising:

recovering water containing at least 500 ppm total dissolved solids and a hydrocarbon product from an active hydrocarbon product well;

separating oil and oily residue from the recovered water;

removing gases from the recovered water;

pressurizing the water; and contacting the pressurized water with a reverse osmosis membrane to produce liquid water having less than 500 ppmw total dissolved solids.

36. The method of claim 35 wherein the separating step comprises passing the water over activated charcoal.

37. The method of claim 35 including the step of adjusting the pH of the water to between 4 and 6 before contacting the water with the reverse osmosis membrane.

38. The method of claim 35 wherein the pressurizing step comprises increasing the pressure on the water to between 250 and 450 psig.

39. The method of claim 35 wherein the contacting step further comprises contacting the pressurized water with a reverse osmosis membrane selected from the group consisting of cellulose acetate, cellulose diacetate, cellulose triacetate, the combination of cellulose diacetate and cellulose triacetate, cellulose nitrate, and asymmetric aromatic polyamides.

40. The method of claim 35 wherein the contacting step further comprises contacting the pressurized water with a composite membrane of a polyfurane separation membrane laid on a polysulfone support layer.

41. The method of claim 35 wherein the reverse osmosis membrane produces non-brackish water comprising water suitable for agricultural use.

42. The method of claim 35 wherein the reverse osmosis membrane produces non-brackish water comprising potable water.

43. The method of claim 35 wherein the reverse osmosis membrane produces non-brackish water transportable through pipes to a location of use.

44. The method of claim 43 wherein the transportable water is placed in pipes formerly used for transporting oil.

* * * * *